June 14, 1927.
H. R. CLARKE
1,632,540
FERTILIZER DISTRIBUTOR
Filed July 15, 1926
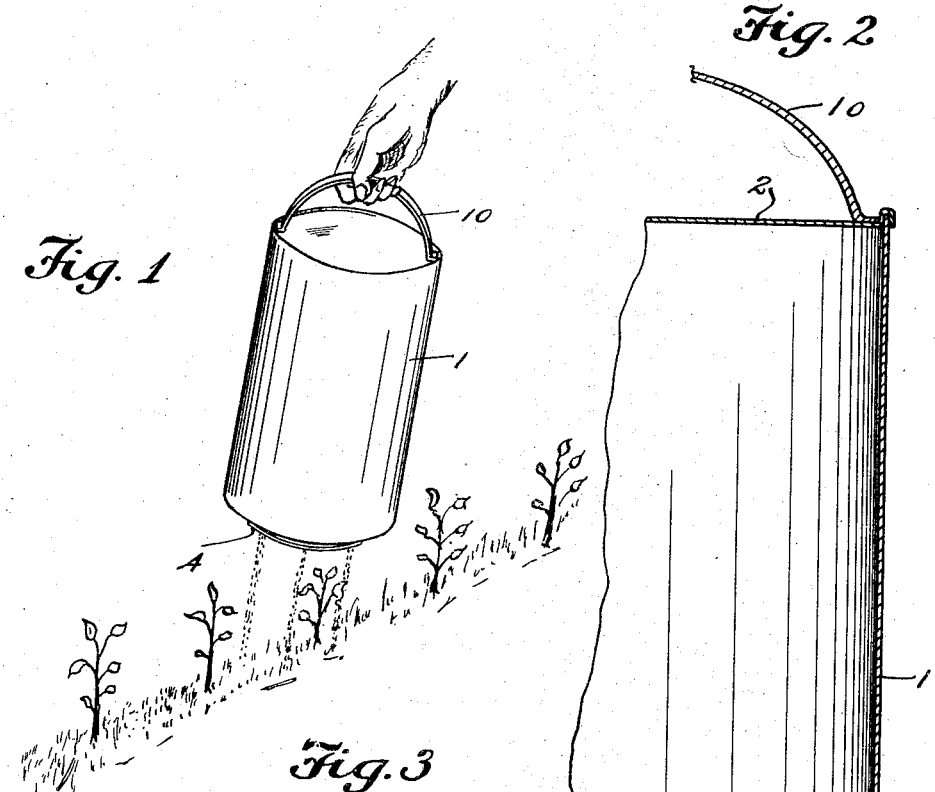
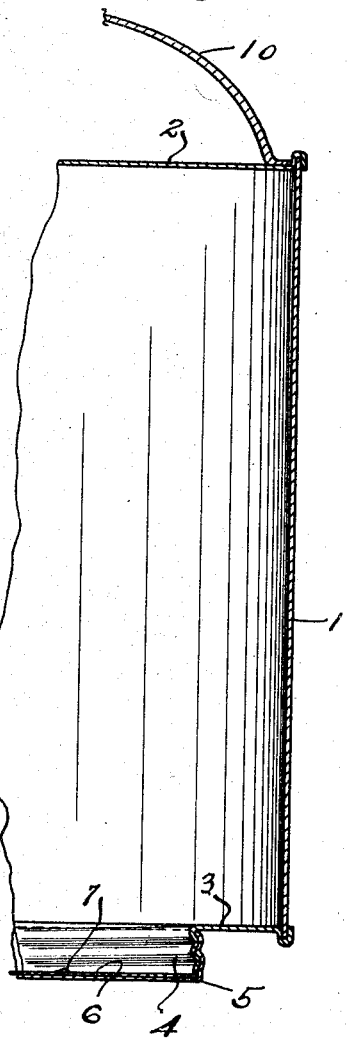
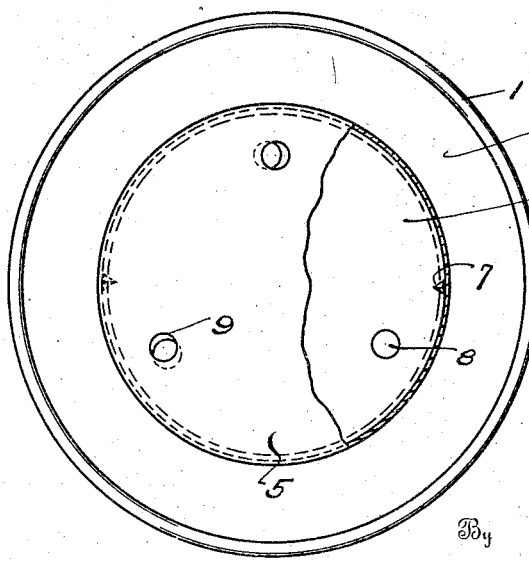
Inventor
H. R. CLARKE Patented June 14, 1927.

1,632,540

UNITED STATES PATENT OFFICE.

HENRY R. CLARKE, OF TARRANT, ALABAMA.

FERTILIZER DISTRIBUTOR.

Application filed July 15, 1926. Serial No. 122,699.

My invention relates to a new and improved type of can or receptacle designed for the effective distribution by hand of fertilizer in dry granular form.

I find that there is a large and increasing demand on the part of small consumers of fertilizer for some means which will be cheaply manufactured, readily recharged, and by the use of which the small user can effectively distribute fertilizer over lawns and gardens and the like.

Heretofore, where fertilizer with a high nitrogen content has been used, the practice has been to mix it with sand or inert matter before sprinkling it over the lawn in order that it may not burn the grass or herbage. This involved handling a bulky mass, the major portion by weight of which was valueless and required skillful manipulation to distribute it uniformly over the lawn.

I have conceived that a fertilizer, high in nitrogen, can be applied in granular form if means for distributing it is designed to produce its uniform and light application over the ground to be treated, and it is of particular importance that the distributor should be of such character that it can be handled by women and without undue fatigue to the user.

With these objects in view I have designed a can having a handle applied at its closed top end and having a wide threaded open neck at its bottom end, which neck is covered by a disk adapted to be clamped in place by a screw cap, the disk and cap having carefully designed and placed openings which in operating position will register and which will permit the material in three or more fine streams to flow continuously from the container when grasped by its handle and thus the distribution of the flowing material can be effected by a gentle and easy swinging motion of the can as the user walks, which produces a light and uniform distribution of the fertilizer with a minimum of exertion. The can can be readily refilled by removing the screw cap and the perforated disk. In order that the disk may not turn with the top, thus preventing registration of the holes when it is desired to use the can, I provide inexpensive means to interlock the disk with the can, such means not interfering with the ready removal of the disk when refilling.

My invention further comprises the novel details of construction and arrangements of parts, which in their preferred embodiment only are illustrated in the accompanying drawings, which form a part of this specification, and in which:—

Fig. 1 is a view of the can shown grasped in the hand of the user in the act of distributing the fertilizer.

Fig. 2 is a partial section of the can enlarged; and

Fig. 3 is a bottom plan view of the can with the disk in place and the screw cap partly broken away.

Similar reference numerals refer to similar parts throughout the drawings.

In the embodiment of my invention illustrated, I show a can or receptacle for distributing fertilizer which comprises a cylindrical body 1 having a solid top or closure 2 and a bottom or closure 3 provided with a threaded neck 4 of large diameter. A screw cap 5 is adapted to interpose a loose disk 6 having a boss or struck-up portion 7, adapted to engage a corresponding indentation in its seat on the outer end of the neck 4, so that when it is held in engagement with the neck by the cap it will be prevented from rotating with the screw cap throughout a limited angle of rotation. The disk 6 is provided with a plurality of relatively large diameter holes 8 arranged equi-distantly about the disk near its periphery and the screw cap is provided with a corresponding series of holes 9 similarly arranged and adapted when the device is in use to be moved into register with the holes 8 and when the device is not in use to be moved out of register with the holes 8, the latter movement serving to firmly clamp the disk against the neck 4. The upper end of the container is provided with a handle 10.

In operation, the disk and screw cap are removed, the receptacle inverted and filled with the fertilizer through the open neck, after which the disk is placed on the neck and then the cap 5 is applied and as it is screwed home the disk will rotate with it until the boss 7 interlocks with the notch in the neck and thereafter the screw cap alone will turn, thus bringing the cap and disk holes out of register and positively closing the open end of the neck. The receptacle is thereupon again inverted and grasped by the handle 10 and carried to the point of use where the screw cap is shifted to bring its holes 9 into more or less of register with the holes 8 and thereupon the container is swung back and forth causing the streams of fertilizer falling through the registering holes 8 and 9 to be distributed by a swinging movement of the receptacle and spread uniformly over the ground, the rate of distribution being controlled both by the rate of outflow through the registering holes and by the progress of the user over the ground to be fertilized. Whenever it is desired to shut off the flow of fertilizer, the device is inverted and the cap 5 is screwed more tightly on and this clamps it and the disk against the open neck in position to seal it as the holes 8 and 9 will have moved out of register.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A fertilizer distributor, comprising a container having a closed top end provided with a handle, and a bottom provided with an open neck, a disk having apertures therein adapted to seat over the neck, and a screw cap having apertures adapted to mount the disk on the neck and to be adjusted to bring its apertures into or out of registration with the apertures in the disk.

2. A fertilizer distributor in accordance with claim 1, in which the distributor neck is notched and the disk indented to interlock with the notch to prevent rotation of the disk during the limited rotation of the screw cap incidental to moving its apertures into and out of registration with those of the disk.

In testimony whereof, I affix my signature.

HENRY R. CLARKE.